United States Patent
Kim et al.

(10) Patent No.: US 10,415,516 B2
(45) Date of Patent: Sep. 17, 2019

(54) ENGINE SYSTEM

(71) Applicant: HYUNDAI MOTOR COMPANY, Seoul (KR)

(72) Inventors: Han Sang Kim, Ansan-si (KR); Choo Saeng Choi, Seongnam-si (KR); Seong Sik Kim, Bucheon-si (KR); Bonghoon Han, Seoul (KR); Jungjoo Park, Gunpo-si (KR); Wootae Kim, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 314 days.

(21) Appl. No.: 15/354,248

(22) Filed: Nov. 17, 2016

(65) Prior Publication Data
US 2017/0314517 A1 Nov. 2, 2017

(30) Foreign Application Priority Data
Apr. 28, 2016 (KR) .................... 10-2016-0052107

(51) Int. Cl.
*F02M 26/04* (2016.01)
*F02B 37/00* (2006.01)
*F02M 26/35* (2016.01)

(52) U.S. Cl.
CPC ............. *F02M 26/35* (2016.02); *F02B 37/00* (2013.01); *F02M 26/04* (2016.02); *Y02T 10/144* (2013.01)

(58) Field of Classification Search
CPC ..... F02B 37/00; F02B 29/0468; F02M 26/04; F02M 26/35; F02M 26/06; F02M 26/27; F02M 26/28; F02M 26/32; Y02T 10/144

(Continued)

(56) References Cited

U.S. PATENT DOCUMENTS

| 4,106,448 A * | 8/1978 | Noguchi ............ F02B 1/06 |
| | | 123/198 F |
| 2007/0017491 A1* | 1/2007 | Maeda ............ F02M 26/48 |
| | | 123/568.18 |

(Continued)

FOREIGN PATENT DOCUMENTS

| EP | 0857870 A2 * | 8/1998 | ............. F02M 26/19 |
| JP | 2011-140922 A | 7/2011 | |

(Continued)

OTHER PUBLICATIONS

Machine Translation JP 2011-140922 Done Jun. 7, 2018.*

*Primary Examiner* — Patrick D Maines
*Assistant Examiner* — Dapinder Singh
(74) *Attorney, Agent, or Firm* — Brinks Gilson & Lione

(57) ABSTRACT

An engine system may include: an engine including a plurality of combustion chambers generating driving torque by burning fuel; an intake line through which fresh air flows into the combustion chambers; an intake manifold for distributing fresh air supplied by the intake line to the combustion chambers; an exhaust line in which exhaust gas exhausted from the combustion chambers flows; a recirculation line branched from the exhaust line and joined to the intake line; a connection pipe disposed at a portion where the recirculation line and the intake line are joined; and a water line connecting the connection pipe and the intake manifold. Condensate water generated at the connection pipe flows in the water line.

10 Claims, 5 Drawing Sheets

(58) Field of Classification Search
USPC .............................. 60/605.2, 287, 288, 602
See application file for complete search history.

(56) References Cited

U.S. PATENT DOCUMENTS

| | | | | |
|---|---|---|---|---|
| 2009/0032000 | A1* | 2/2009 | Rim | F01N 5/02 |
| | | | | 123/568.12 |
| 2011/0209473 | A1* | 9/2011 | Fritz | F01K 23/065 |
| | | | | 60/605.2 |
| 2012/0111001 | A1* | 5/2012 | Espinosa | F01K 21/04 |
| | | | | 60/605.2 |
| 2013/0205782 | A1* | 8/2013 | Majumdar | F01K 7/40 |
| | | | | 60/653 |
| 2015/0121881 | A1* | 5/2015 | Zhang | F02C 7/143 |
| | | | | 60/728 |
| 2016/0138451 | A1* | 5/2016 | Takada | F01N 3/2066 |
| | | | | 60/278 |

FOREIGN PATENT DOCUMENTS

| | | | |
|---|---|---|---|
| JP | 2013-011227 | A | 1/2013 |
| JP | 2016-044602 | A | 4/2016 |
| KR | 10-2001-0047523 | A | 6/2001 |
| KR | 10-2010-0062747 | A | 6/2010 |
| KR | 10-2015-0084194 | A | 7/2015 |

* cited by examiner

ENGINE SYSTEM

CROSS-REFERENCE TO RELATED APPLICATION

This application claims priority to and the benefit of Korean Patent Application No. 10-2016-0052107, filed on Apr. 28, 2016, the entire contents of which are incorporated herein by reference.

FIELD

The present disclosure relates to an engine system. More particularly, the present disclosure relates to an engine system that can inject condensate water.

BACKGROUND

The statements in this section merely provide background information related to the present disclosure and may not constitute prior art.

An engine appropriately mixes air and fuel and generates driving power by burning the mixed gas.

In order to obtain desired output power and combustion efficiency, sufficient air should be supplied to the engine. For this, a turbocharger is used to increase combustion efficiency and supply sufficient air to the engine.

Generally, a turbine of the turbocharger is rotated by pressure of exhaust gas exhausted from the engine, a compressor of the turbocharger compresses fresh air flowing in from the outside, and the compressed air is supplied to a combustion chamber of the engine. The turbocharger has been applied to almost diesel engines, and has recently been applied to gasoline engines.

Further, NOx (nitrous oxide) included in the exhaust gas is regulated as a major air pollutant and many researches have been carried out in order to reduce the amount of NOx in exhaust gases.

An exhaust gas recirculation (EGR) system mounted in a vehicle reduces noxious exhaust gases of the vehicle. Generally, the amount of NOx in the exhaust gas is increased in an oxygen rich air mixture, and the air mixture is combusted well. Therefore, the exhaust gas recirculation system reduces the amount of NOx in the exhaust gas as a consequence of a part of the exhaust gas being recirculated to the air mixture in order to reduce the oxygen ratio in the air mixture and so hinder combustion.

An LP-EGR (low pressure EGR) system is one of the exhaust gas recirculation (EGR) systems. The LP-EGR system recirculates the exhaust gas passing through the turbine of the turbocharger to an intake path of an upstream side of the compressor.

However, the exhaust gas recirculated by the EGR system has high temperature and humidity. Therefore, condensate water is generated when the recirculated exhaust gas and the external air having a low temperature are mixed. We have found that the condensate water has very high acidity by various material included in exhaust gas.

If the condensate water is bumped to a compressor wheel being rotated at a high speed, then the compressor wheel is damaged. According to the conventional art, a method that coats the compressor wheel has been used in order to reduce or prevent damage and corrosion of the compressor wheel, but we have discovered that manufacturing cost is increased for coating the compressor wheel.

Further, various parts (i.e., compressor wheel, or compressor housing, and so on) are corroded by the condensate water having high acidity. And if the condensate water flows into a cylinder of an engine, combustion of the engine becomes unstable.

The above information disclosed in this Background section is only for enhancement of understanding of the background of the present disclosure and therefore it does not form the prior art.

SUMMARY

The present disclosure provides an engine system that can inject condensate water generated by EGR gas and fresh air into a combustion chamber.

An engine system according to one form of the present disclosure may include: an engine including a plurality of combustion chambers generating driving torque by burning fuel; an intake line through which fresh air flows into the combustion chambers; an intake manifold for distributing fresh air supplied by the intake line to the combustion chambers; an exhaust line in which exhaust gas exhausted from the combustion chambers flows; a recirculation line branched from the exhaust line and joined to the intake line; a connection pipe disposed at a portion where the recirculation line and the intake line are joined; and a water line connecting the connection pipe and the intake manifold, wherein the condensate water flows in the water line.

The engine system may further include a water valve disposed in the water line and selectively closing the water line.

The engine system may further include an injection apparatus for injecting the condensate water generated at the connection pipe into the combustion chambers of the engine.

The injection apparatus may include a water pump disposed in the water line and pumping the condensate water generated at the connection pipe; and an injector for injecting the condensate water pumped by the water pump into the intake manifold.

The connection pipe may include an intake pipe communicating with the intake line; and a recirculation pipe communicated with the recirculation line, surrounding an external circumference of the intake pipe, and communicated with the intake pipe.

A plurality of communication holes may be formed in the intake pipe, and the recirculation pipe is communicated with the intake pipe through the communication holes.

The intake pipe may include an up-stream portion formed in a cylinder shape having a predetermined diameter; a down-stream portion formed in a cylinder shape having a diameter less than the diameter of the up-stream portion; and a connection portion connecting the up-stream portion and the down-stream portion; wherein the communication holes are formed in a portion where the connection portion and the down-stream portion are connected.

An entire area of the communication holes may be equivalent to or greater than a cross-sectional area of the recirculation line.

A cooling fin may be formed on an external circumference of the intake pipe.

The cooling fin may be formed on an exterior circumference of the connection portion and the down-stream portion.

The engine system may further include a turbine disposed at the exhaust line and rotated by the exhaust gas exhausted from the combustion chambers; and a compressor disposed at the intake line, rotated together with the turbine, and compressing fresh air.

According to another form of the present disclosure, since condensate water generated by EGR gas and fresh air is injected into a combustion chamber of an engine, it is possible to inhibit or prevent corrosion of peripheral components by condensate water and obtain combust stability of the engine.

Further, since condensate water generated by EGR gas and fresh air is injected into a combustion chamber of an engine, a temperature of the combustion chamber is decreased and carbon deposit is removed, and thus abnormal combustion, such as knocking, can be inhibited or prevented.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
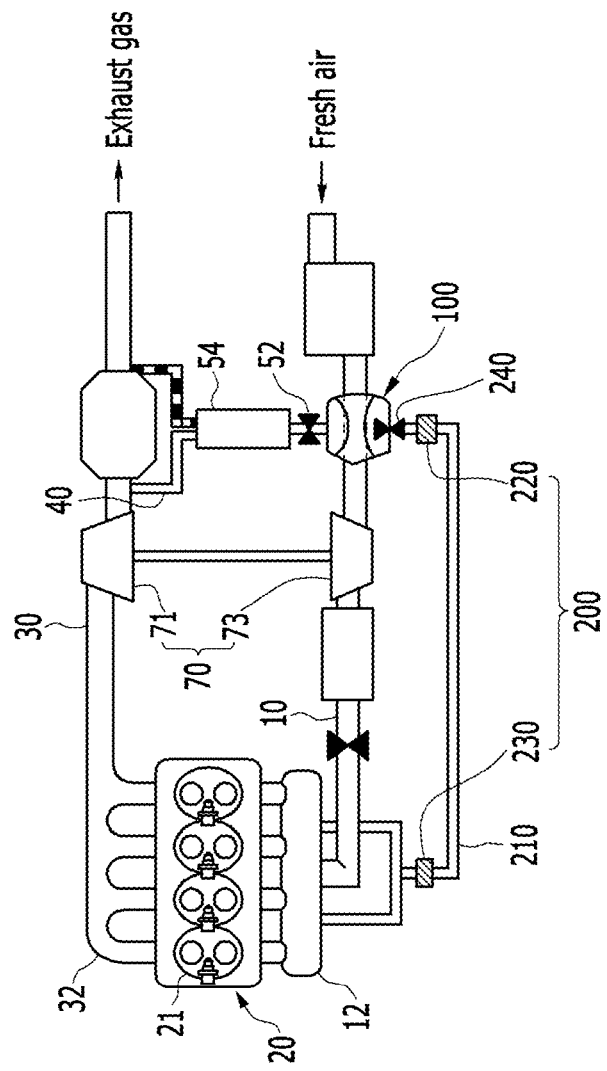
FIG. 1 is a schematic view illustrating an engine system for exhausting condensate water.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In order to clearly describe the present disclosure, portions that are not connected with the description will be omitted.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

FIG. 1 is a schematic view illustrating an engine system for exhausting condensate water according one form of the present disclosure.

As shown in FIG. 1, an engine system includes: an engine 20 including a plurality of combustion chambers 21 generating driving torque by burning fuel, an intake line 10 through which fresh air flows into the combustion chambers 21, an intake manifold 12 for distributing fresh air supplied by the intake line 10 to the combustion chambers 21, an exhaust line 30 in which exhaust gas exhausted from the combustion chambers flows, a recirculation line 40 branched from the exhaust line 30 and joined to the intake line 10, a connection pipe 100 disposed at a portion where the recirculation line 40 and the intake line 10 are joined, and a water line 210 connecting the connection pipe 100 and the intake manifold 12, wherein the condensate water flows in the water line 210.

The engine system according to one form of the present disclosure may further include: a water valve 240 disposed in the water line 210 and selectively closing the water line 210. That is, the condensate water is supplied to the intake manifold 12 through the water line 210 when the water valve 240 is opened, and the condensate water is not supplied to the intake manifold 12 through the water line 210 when the water valve 240 is closed.

The water valve 240 may be opened when engine is normally operated, the condensate water generated at the connection pipe 100 flows to the intake manifold 12 passing through the water line 210 by negative pressure in the combustion chamber 21, and thus the condensate water is supplied to the combustion chambers 21

However, since the negative pressure in the combustion chambers 21 is very low when the engine is idle state or the engine is operated in high load region, condensate water cannot flow through the water line 210. Or, the condensate water cannot flow through the water line 210 by negative pressure in the combustion chambers 21 when the condensate water is generated too much. Thus, the condensate water may be stagnant in the intake manifold 12. Therefore, the water valve 240 is closed.

In these cases, the water valve 240 may be opened, and the condensate water may be forcibly supplied to the combustion chambers 21 by an injection apparatus 200 (will be described later).

For this, the engine system may further include an injection apparatus 200 for injecting the condensate water generated at the connection pipe into the combustion chambers.

An exhaust gas purification apparatus 60 that purifies exhaust gas exhausted from the combustion chambers 21 may be disposed at the exhaust line 30. The exhaust gas purification apparatus 60 may include an LNT (lean NOx trap), a DOC (diesel oxidation catalyst), and a DPF (diesel particulate filter).

The engine system includes an exhaust gas recirculation (EGR) apparatus in which a part of the exhaust gas exhausted from the combustion chambers 21 is resupplied to the combustion chamber 21. The EGR apparatus includes: a recirculation line 40 branched from the exhaust line 30 and joined to the intake line 10; an EGR cooler 54 disposed at the recirculation line 40; and an EGR valve 52 disposed at the recirculation line 40. The EGR cooler 54 cools exhaust gas (hereinafter, "EGR gas") recirculated through the recirculation line 40. Recirculation gas amount is adjusted by the EGR valve 52.

The engine system includes a turbocharger 70 that compresses the fresh air (or external air) flowing in through the intake line 10 and the EGR gas flowing in through the recirculation line 40 and supplies the compressed air to the combustion chambers 21. The turbocharger 70 includes turbine 71 disposed at the exhaust line 30 and rotated by the exhaust gas exhausted from the combustion chambers 21, and a compressor 73 disposed at the intake line 10 and compressing fresh air and EGR gas by being rotated together with the turbine 71.

The turbine 71 includes a turbine housing, and a turbine wheel disposed in the turbine housing and rotated by rotation force of exhaust gas exhausted from the combustion chambers 21. The compressor 73 includes a compressor housing, and a compressor wheel disposed in the compressor housing and rotated together with the turbine wheel. Fresh air and recirculation gas are compressed by rotation of the compressor wheel 130, and the compressed gas is supplied to the combustion chambers 21.

Hereinafter, the connection pipe 100 connecting the intake line 10 and the recirculation line 40 will be described in detail.

Figure 2:
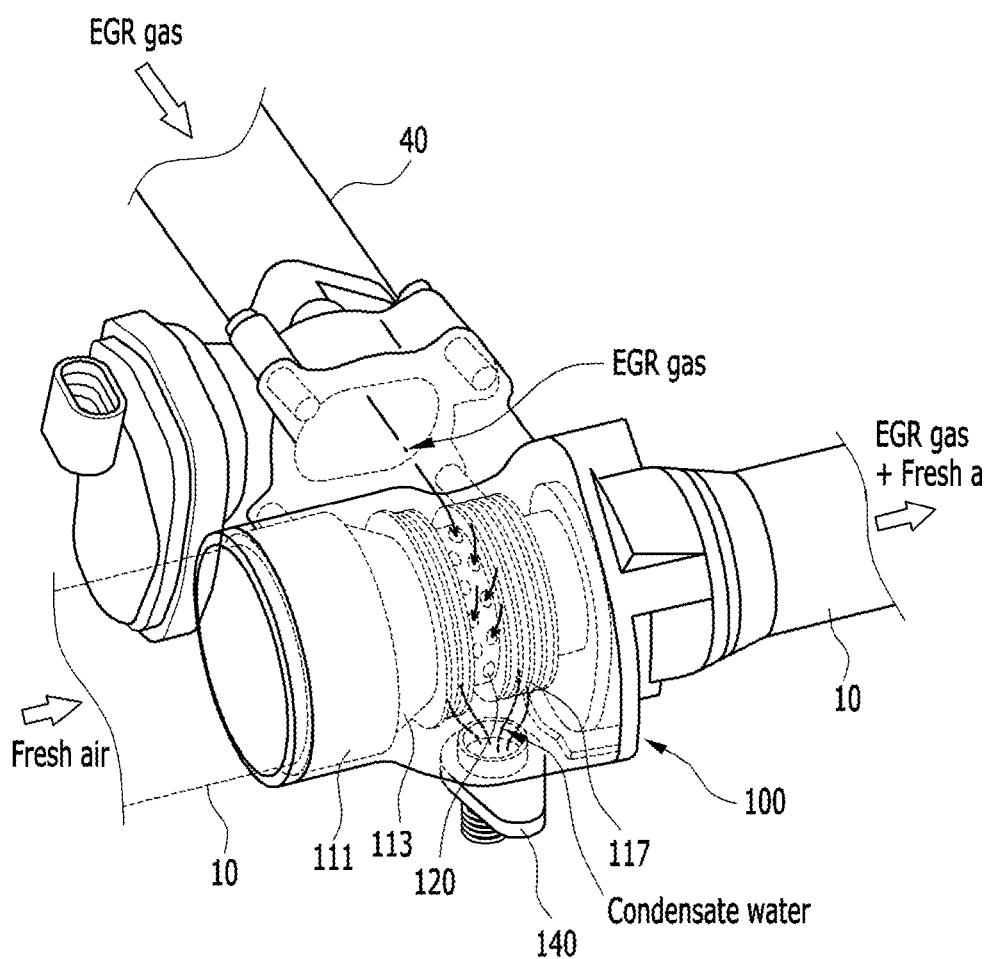
FIG. 2 is a perspective view illustrating a connection pipe.
Figure 3:
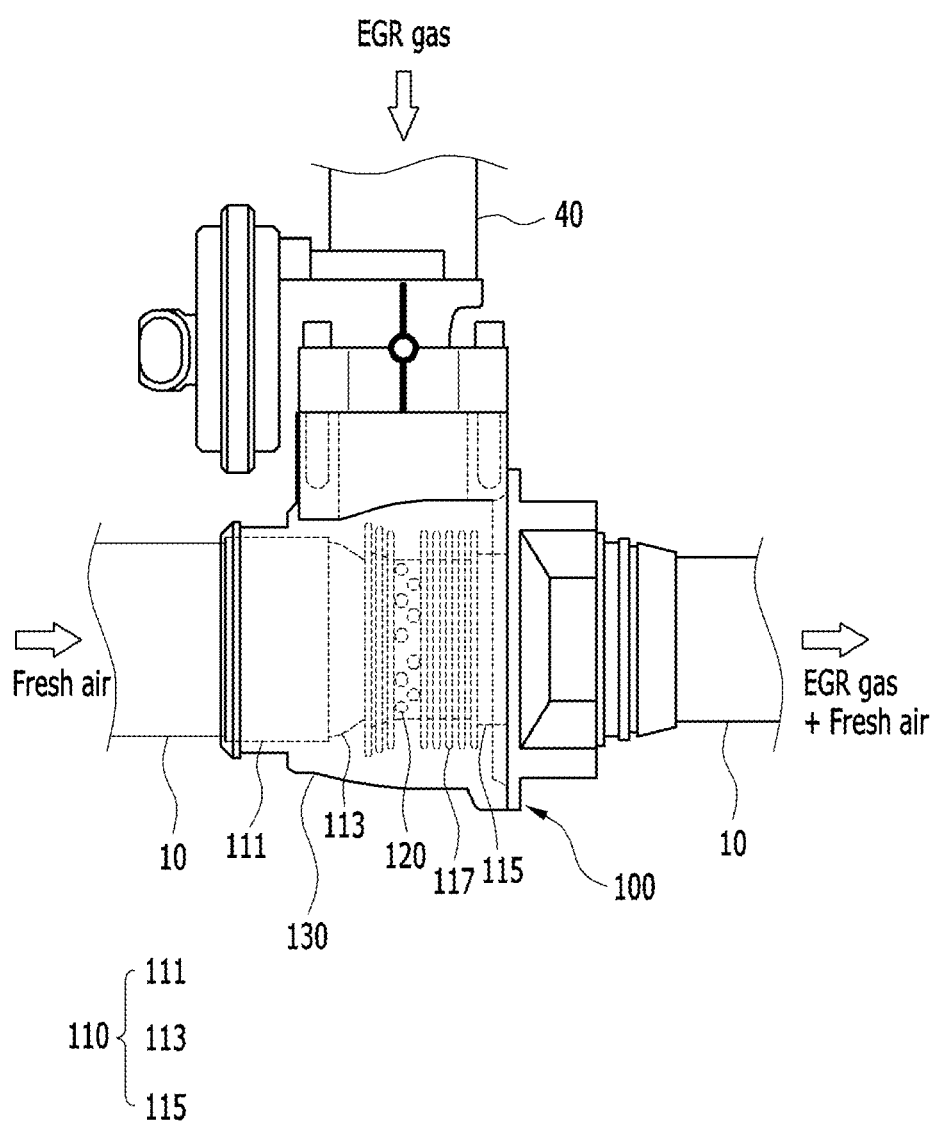
FIG. 3 is a top plan view illustrating a connection pipe.

FIG. 2 is a perspective view illustrating a connection pipe according to one form of the present disclosure. FIG. 3 is a top plan view illustrating a connection pipe according to the present disclosure.

As shown in FIG. 2 and FIG. 3, the connection pipe 100 is disposed at a portion where the recirculation line 40 is joined to the intake line 10.

The connection pipe 100 includes an intake pipe 110 communicated with the intake line 10, and a recirculation pipe 130. The recirculation pipe 130 communicates with the recirculation line 40 and the intake pipe 110, and is formed to surround an external circumference of the intake pipe 110. A space is formed between outer surface of the intake pipe 110 and inner surface of the recirculation pipe 130.

The intake pipe 110 includes an up-stream portion 111 formed in a cylinder shape having a predetermined diameter, a down-stream portion 115 formed in a cylinder shape having a diameter less than the diameter of the up-stream portion 111, and a connection portion 113 connecting the up-stream portion 111 and the down-stream portion 115.

A plurality of communication holes 120 are formed at the intake pipe 110, and the recirculation pipe 130 is communicated with the intake pipe 110 through the communication holes 120. In one form, the communication holes 120 are formed in a portion where the connection portion 113 and the down-stream portion 115 are connected.

Figure 4:
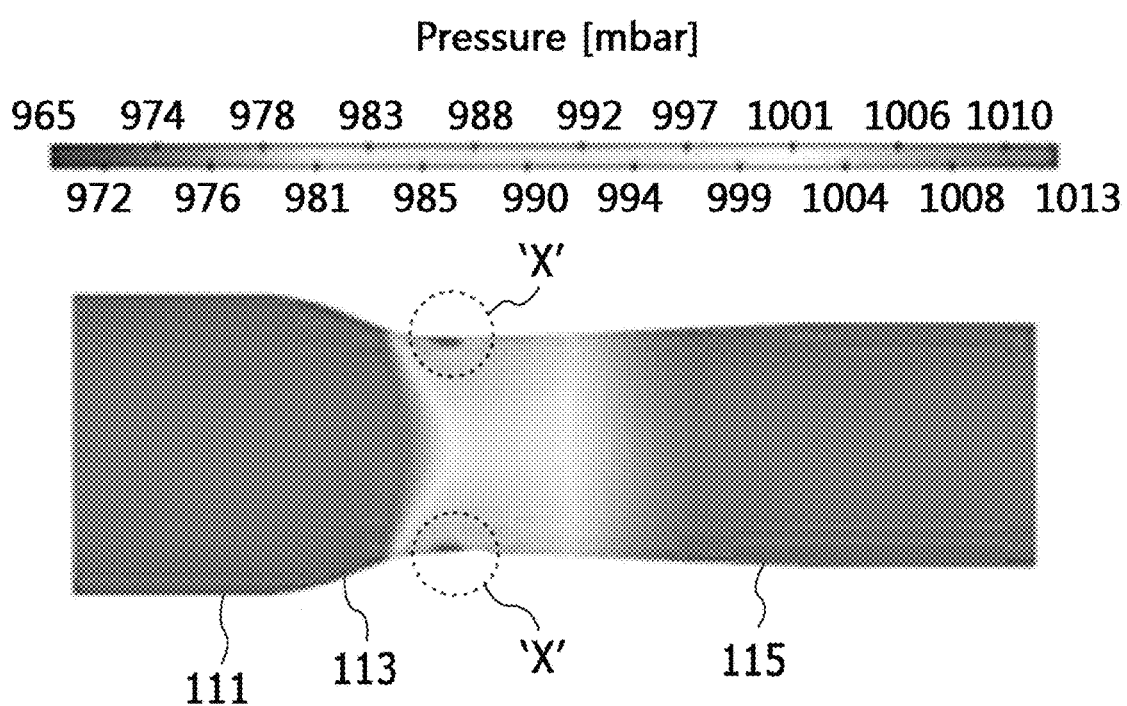
FIG. 4 is an analysis result of an intake pipe.

FIG. 4 is an analysis result of an intake pipe according to one form of the present disclosure. FIG. 4 shows a result analyzing pressure of fresh air flowing in the intake pipe 110

Referring to FIG. 4, pressure of fluid (i.e., fresh air) flowing in the intake pipe 110 is decreased at a portion where the connection portion 113 and down-stream portion 115 are met (refer to 'X' of FIG. 4). Since the diameter of the down-stream portion 115 is less than the diameter of the up-stream portion 111, the velocity of fresh air is increased but the pressure of fresh air is decreased at a portion where the connection portion 113 and the down-stream portion 115 are connected. This is a kind of Bernoulli's theorem.

As such, since the pressure of fresh air is decreased at the portion where the connection portion 113 and the down-stream portion 115 are connected, the EGR gas having relatively high pressure flowing from the recirculation pipe 130 can smoothly flow to the intake pipe 110 through the communication holes 120.

Figure 5:
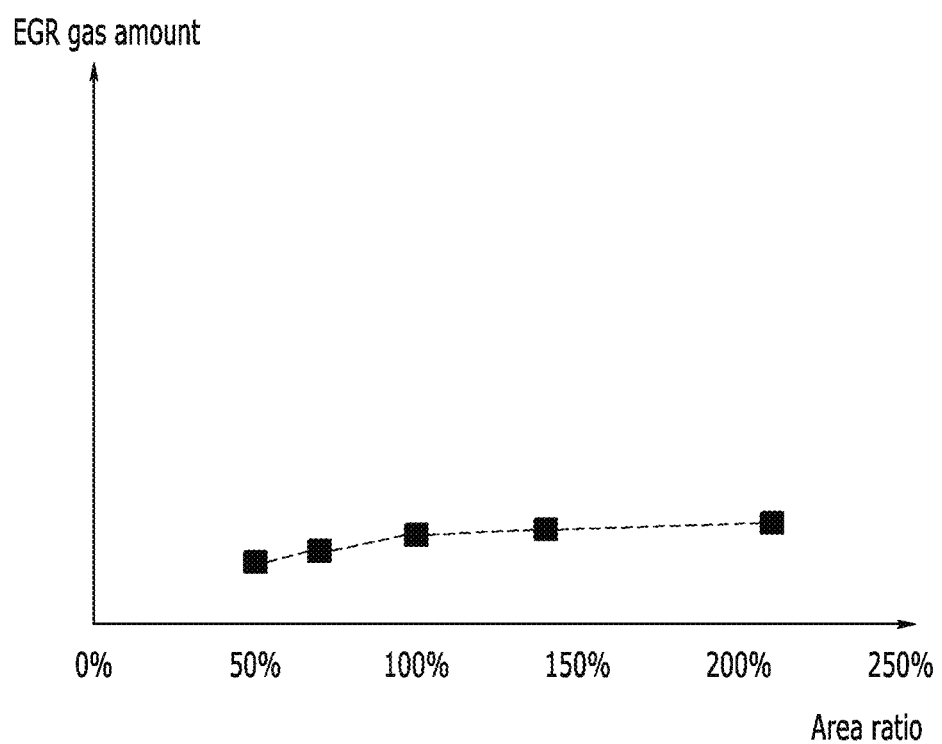
FIG. 5 is a graph illustrating a relationship between an entire area of communication holes and a cross-sectional area of a recirculation line.

FIG. 5 is a graph illustrating a relationship between an entire area of communication holes and a cross-sectional area of a recirculation line according to one form of the present disclosure. In FIG. 5, a horizontal axis denotes an area ratio between the entire area of the communication holes 120 and the cross-sectional area of the recirculation line 40 (i.e., entire area of communication holes 120/cross-sectional area of recirculation line 40), and a vertical axis denotes EGR gas amount flowing into the intake pipe 110 through the communication holes 120.

As shown in FIG. 5, EGR gas amount flowing into the intake pipe 110 through the communication holes 120 increases as the area ratio increases, but the EGR gas amount is relatively stable (i.e., little increase) when the area ratio is greater than approximately 100%.

However, there is a possible that strength of the intake pipe 110 is weakened when the area ratio is greater than approximately 100%. Thus, in one form, the entire area of the communication holes 120 is equivalent to the cross-sectional area of the recirculation line 40.

Referring to FIG. 2 and FIG. 3, a plurality of cooling fins 117 are formed in an external circumference of the intake pipe 110. The cooling fins 117 may be formed in a circular disk shape along an external circumference of the intake pipe 110. But the present disclosure is not limited to the disclosed forms, and the cooling fin 117 may be formed as another shape.

The cooling fin 117 may be formed on an exterior circumference of the connection portion 113 and the down-stream portion 115. The condensate water can be easily generated by the cooling fin 117 when the EGR gas is at a relatively high temperature (e.g., approximately Celsius 100-150 degrees) and when humidity flowing through the recirculation line 40 contacts the intake line 10 in which fresh air having a relatively low temperature (e.g., approximately Celsius 25 degrees) flows.

That is, since a contact area that the EGR gas is in contact with the intake line 10 is increased by the cooling fin 117, moisture included in the EGR gas is easily condensed, so condensate water is easily generated.

Meanwhile, the injection apparatus 200 includes: the water line 210, a water pump 220 disposed in the water line 210, and an injector 230 for injecting the condensate water flowing in the water line 210 into the intake manifold 12.

The water line 210 connects the recirculation pipe 130 of the connection pipe and the intake manifold 12, and the condensate water stagnant in the recirculation pipe 130 of the connection pipe 100 flows in the water line 210.

The water pump 220 is disposed in the water line 210, and pumps the condensate water pooled in the recirculation pipe 130 of the connection pipe 100 to the injector 230. Generally, since there is a case that the negative pressure for supplying the condensate water into the intake manifold 12 is not sufficiently formed according to a driving region (e.g., a high load region).

The injector 230 injects the pumped condensate water by the water pump 220 into the intake manifold 12. That is, the injector 230 atomizes the pumped condensate water, and injects the atomized condensate water into the intake manifold 12. As such, the injected condensate water by the injector 230 removes carbon deposit in the intake manifold 12, and thus it is possible to inhibit or prevent abnormal combustion, such as a knocking generated in the combustion chamber. The combustion stability and fuel consumption can be improved.

Hereinafter, an operation of the engine system according to one form of the present disclosure will be described in detail.

Driving torque is generated in the combustion chambers 21 of the engine 20 by burning fuel, and the exhaust gas is discharged from the combustion chambers 21 to the exhaust line 30.

A part of the exhaust gas flowing in the exhaust line 30 flows into the recirculation line 40 that is branched from the exhaust line 30 and is joined to the intake line 10.

The EGR gas flowing in the recirculation line 40 is mixed with fresh air flowing in the intake line 10, and the mixed gas (EGR gas and fresh air) is supplied to the combustion chambers 21 of the engine 20. At this time, the mixed gas (EGR gas and fresh air) may be compressed by the compressor 73 of the turbocharger 70, and be supplied to the combustion chambers 21 of the engine 20.

Meanwhile, the EGR gas flowing in the recirculation line 40 has a relatively high temperature and humidity comparing to fresh air flowing into from outside. In other words, the fresh air flowing in the intake line 10 is a relatively low temperature comparing to the EGR gas.

Therefore, the EGR gas having high temperature and humidity flows into the recirculation pipe 130 through the recirculation line 40, the EGR gas contacts the intake line 10 that the fresh air having low temperature flows, and condensate water is generated. At this time, since a contact area that the EGR gas is in contact with the intake line 10 is increased by the cooling fin 117, condensate water is smoothly generated.

The condensate water is pooled in a lower portion of the recirculation pipe 130, and is supplied to the combustion chambers 21 through the water line 210.

When the engine is normally operated, the water valve 240 disposed in the water line 210 is opened, the condensate water can be supplied to the combustion chambers 12 through the water line 210 and the intake manifold 12 by negative pressure in the combustion chambers 12.

If the engine is an idle state or the condensate water amount is great, the condensate water is injected into the intake manifold 12 and the combustion chambers 12 by the injection apparatus 200.

Meanwhile, the EGR gas of which humidity becomes low by generation of condensate water flows into the intake pipe 110 through the communication holes 120, and the EGR gas is mixed with fresh air flowing in the intake pipe 110. At this time, since the communication holes 120 are formed at a portion where the connection portion 113 and the down-stream portion 115 are connected (i.e., a portion where the pressure of the fresh air is minimized), the EGR gas can smoothly flow into the intake pipe 110.

The mixed gas (EGR gas and fresh air) is compressed by the compressor 73 of the turbocharger 70, and the compressed mixed gas is supplied to the combustion chambers 21.

As described above, the EGR gas having high temperature and humidity contacts with cold intake pipe 110, and condensate water is generated by condensing before the EGR gas having high temperature and humidity is mixed with the fresh air. Therefore, it is possible to decrease humidity of the EGR gas. Since condensate water is generated when the EGR gas that has high humidity is mixed with fresh air, the decreased humidity of the EGR gas may inhibit or prevent corrosion of parts, such as the compressor wheel, and damage of the compressor wheel.

Meanwhile, the condensate water pooled in the lower portion of the recirculation pipe 130 is pumped by the water pump 220 to the injector 230.

The injector 230 atomizes the pumped condensate water, and injects the condensate water into the intake manifold 12 and the combustion chambers 12. The condensate water injected by the injector 230 removes carbon deposit in the intake manifold 12 and the combustion chambers 12.

As described above, since the atomized condensate water generated by the EGR gas and the fresh air is injected into the intake manifold 12 and the combustion chambers, it is possible to inhibit or prevent corrosion of parts, such as the compressor wheel, and damage of the compressor wheel by the condensate water.

Further, since the condensate water generated by the EGR gas and the fresh air is injected into the intake manifold 12 and the combustion chambers 21 by the injector 230, it is possible to remove carbon deposit in the intake line, the intake manifold 12, and the combustion chambers, and thus abnormal combustion, such as knocking in the combustion chamber, can be inhibited or prevented.

DESCRIPTION OF SYMBOLS

10: intake line
12: intake manifold
20: engine
21: combustion chamber
30: exhaust line
40: recirculation line
52: EGR valve
54: EGR cooler
70: turbocharger
71: turbine
73: compressor
100: connection pipe
110: intake pipe
111: up-stream portion
113: connection portion
115: down-stream portion
117: cooling fin
120: communication hole
130: recirculation pipe
200: injection apparatus
210: water line
220: water pump
230: injector
240: water valve While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. An engine system comprising:
   an engine including a plurality of combustion chambers generating driving torque by burning fuel;
   an intake line through which fresh air flows into the combustion chambers;
   an intake manifold configured to distribute fresh air supplied by the intake line to the combustion chambers;
   an exhaust line in which exhaust gas exhausted from the combustion chambers flows;
   a recirculation line branched from the exhaust line and joined to the intake line;
   a connection pipe disposed at a portion where the recirculation line and the intake line are joined; and
   a water line connecting the connection pipe and the intake manifold, wherein condensate water flows in the water line,
   wherein the connection pipe includes:
      an intake pipe communicating with the intake line; and
      a recirculation pipe configured to communicate with the recirculation line, surround an outer surface of the intake pipe, and communicate with the intake pipe, and
   wherein a space is formed between the outer surface of the intake pipe and an inner surface of the recirculation pipe.

2. The engine system of claim 1, further comprising a water valve disposed in the water line and selectively closing the water line.

3. The engine system of claim 1, further comprising an injection apparatus configured to inject the condensate water generated at the connection pipe into the combustion chambers of the engine.

4. The engine system of claim 3, wherein the injection apparatus includes:
- a water pump disposed in the water line and pumping the condensate water generated at the connection pipe; and
- an injector configured to inject the condensate water pumped by the water pump into the intake manifold.

5. The engine system of claim 1, wherein
- a plurality of communication holes are formed in the intake pipe, and
- the recirculation pipe is communicated with the intake pipe through the communication holes.

6. The engine system of claim 1, wherein the intake pipe includes:
- an up-stream portion formed in a cylinder shape having a predetermined diameter;
- a down-stream portion formed in a cylinder shape having a diameter smaller than the predetermined diameter of the up-stream portion; and
- a connection portion connecting the up-stream portion and the down-stream portion;
- wherein the communicate holes are formed in a portion where the connection portion and the down-stream portion are connected.

7. The engine system of claim 6, wherein a cooling fin is formed in at least one of an exterior circumference of the connection portion or the down-stream portion.

8. The engine system of claim 1, wherein an entire area of the communication holes is equivalent to or greater than a cross-sectional area of the recirculation line.

9. The engine system of claim 1, wherein a cooling fin is formed in an external circumference of the intake pipe.

10. The engine system of claim 1, further comprising:
- a turbine disposed at the exhaust line and rotated by the exhaust gas exhausted from the combustion chambers; and
- a compressor disposed at the intake line and rotated together with the turbine and configured to compress fresh air.

* * * * *